US012809826B2

(12) United States Patent
Al Mahmood et al.

(10) Patent No.: US 12,809,826 B2
(45) Date of Patent: Nov. 24, 2026

(54) PARALLEL FILE PROCESSING FOR EFFICIENT DATA INGESTION

(71) Applicant: Snowflake Inc., Bozeman, MT (US)

(72) Inventors: Abdullah Al Mahmood, Bothell, WA (US); Florian Andreas Funke, Berlin (DE); Ganeshan Ramachandran Iyer, Redmond, WA (US); Canzhou Qu, Bellevue, WA (US); Raghav Ramachandran, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 51 days.

(21) Appl. No.: 18/952,865

(22) Filed: Nov. 19, 2024

(65) Prior Publication Data

US 2026/0140927 A1 May 21, 2026

(51) Int. Cl.
*G06F 16/18* (2019.01)
*G06F 9/48* (2006.01)
*G06F 16/13* (2019.01)

(52) U.S. Cl.
CPC ........ *G06F 16/1858* (2019.01); *G06F 9/4881* (2013.01); *G06F 16/13* (2019.01)

(58) Field of Classification Search
CPC ..... G06F 16/13; G06F 16/1858; G06F 9/4881
USPC .......................................................... 707/812
See application file for complete search history.

(56) References Cited

U.S. PATENT DOCUMENTS

| | | | | |
|---|---|---|---|---|
| 2013/0166568 A1* | 6/2013 | Binkert | G06F 16/81 | 707/769 |
| 2014/0279838 A1* | 9/2014 | Tsirogiannis | G06F 16/235 | 707/603 |
| 2018/0336072 A1* | 11/2018 | Guha | G06F 16/116 | |

OTHER PUBLICATIONS

Kumaigorodski, Alexander et al. "Fast CSV Loading Using GPUs and RDMA for In-Memory Data Processing". DOI: 10.18420/btw2021-01. Published Sep. 2021. Accessed Feb. 21, 2026 (Year: 2021).*

Apache Hadoop, "Mapreduce", [Online]. Retrieved from the Internet: https: github.com apache hadoop blob trunk hadoop-mapreduce-project hadoop-mapreduce-client hadoop-mapreduce-client-core src main java org apache hadoop mapreduce lib input FileInputFormat.java#L449, 14 pages.

Apache Hadoop, "Mapred", [Online]. Retrieved from the Internet: https: github.com apache hadoop blob trunk hadoop-mapreduce-project hadoop-mapreduce-client hadoop-mapreduce-client-core src main java org apache hadoop mapred FileInputFormat.java#L377, (Accessed online Feb. 17, 2025), 17 pages.

Apache Spark, "CSV Files", Spark 3.5.3 Documentation, [Online]. Retrieved from the Internet: URL: CSV Files—Spark 3.5.3 Documentation, (Accessed online Feb. 17, 2025), 5 pages.

(Continued)

*Primary Examiner* — Vaishali Shah
*Assistant Examiner* — Lauren Zannah Ganger
(74) *Attorney, Agent, or Firm* — Schwegman Lundberg & Woessner, P.A.

(57) ABSTRACT

An input file is split into a multiple chunks. Each chunk is assigned to one of multiple worker nodes assigned to processing the input file. Refined boundaries for the multiple chunks are calculated. The refined boundaries define multiple adjusted chunks. The calculating of the refined boundaries comprises determining summary statistics for the multiple chunks, determining start positions of the multiple chunks based on the summary statistics, and determining end positions of the multiple chunks based on the start positions of the multiple chunks. Data scan passes are performed on the multiple adjusted chunks based on the refined boundaries to populate one or more data structures for storing information extracted from the input file.

20 Claims, 8 Drawing Sheets

(56) References Cited

OTHER PUBLICATIONS

Clickhouse Clickbench, "", Snowflake README.md, [Online]. Retrieved from the Internet: https: github.com ClickHouse ClickBench blob Obe9927e62fea003a82ba49a485a3e02cee96141 snowflake README.md?plain=1#L32, (Accessed online Feb. 17, 2025), 2 pages.
Ge, Chang, "Speculative distributed CSV data parsing for big data analytics", In Proceedings of the International Conference on Management of Data (SIGMOD), [Online]. Retrieved from the Internet: URL: https: badrish.net papers dp-sigmod19.pdf, (2019), 17 pages.
Github, "Wiseio Paratext A library for reading text files over multiple cores", [Online]. Retrieved from the Internet: URL: https: github.com wiseio paratext tree master, (Accessed online Feb. 17, 2025), 8 pages.
Github, "The One Billion Row Challenge A fun exploration of how quickly 1B rows from a text file can be aggregated with Java", [Online]. Retrieved from the Internet: URL: GitHub—gunnarmorling 1brc: 1 ??????? The One Billion Row Challenge—A fun exploration of how quickly 1B rows from a text file can be aggregated with Java, (Accessed online Feb. 17, 2025), 23 pages.
Github, "Apache Hadoop", [Online]. Retrieved from the Internet: https: github.com apache hadoop tree trunk, (Accessed online Feb. 17, 2025), 3 pages.
Max Planck Society for the Advan, "14 Load Balancing—People", [Online]. Retrieved from the Internet: https: url.us.m.mimecastprotect.com s e22ACM8053fxADrqT1uzS8_ba4?domain=people.mpi-inf.mpg. de, (Accessed online Feb. 17, 2025), 16 pages.
Muhlbauer, Tobias, "Instant Loading for Main Memory Databases", PVLDB, 6(14), [Online]. Retrieved from the Internet: URL: https: www.vldb.org pvldb vol. 6 p1702-muehlbauer.pdf, (2013), 12 pages.
Pandey, Jitendra, "Hive+Tez: A performance deep dive", [Online]. Retrieved from the Internet: URL: Hive+Tez: A performance deep dive | PPT | Free Download lb.pdf, (Jun. 4, 2014), 26 pages.
Wikipedia, "Amdahl's Law", [Online]. Retrieved from the Internet: URL: Amdahl's law—Wikipedia, (Accessed online Feb. 17, 2025), 8 pages.

* cited by examiner

PARALLEL FILE PROCESSING FOR EFFICIENT DATA INGESTION

TECHNICAL FIELD

Embodiments of the disclosure relate generally to cloud data platforms and, more specifically, to parallel file processing for efficient data ingestion.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
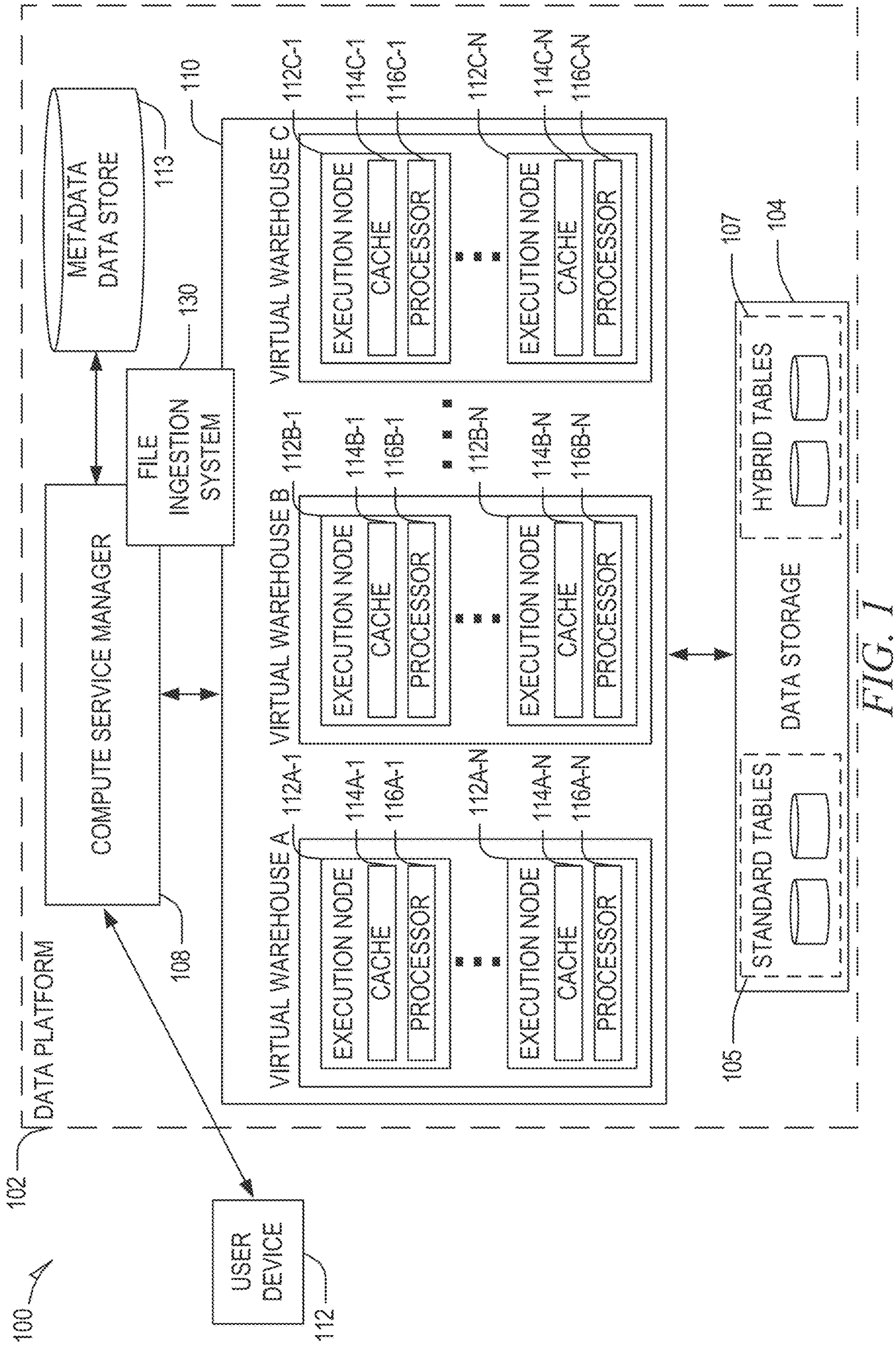
FIG. 1 illustrates an example computing environment that includes a cloud data platform, in accordance with some examples.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The field of distributed data processing has evolved rapidly in recent years to address the challenges posed by the exponential growth of data volumes. Comma-Separated Values (CSV) files, due to their simplicity and widespread support, remain a popular format for storing and transferring large datasets. However, efficiently processing files such as CSV files in distributed computing environments presents several challenges.

One of the primary challenges in distributed CSV processing is managing the distribution of work across multiple computing resources. When dealing with large files or datasets comprising numerous files, ensuring an even workload distribution can be complex. This challenge is compounded by the potential for data skew, where some computing resources may be overloaded while others remain underutilized.

Another challenge lies in handling the various formatting complexities that CSV files can present. These may include multi-line fields, quoted content, and different escape character configurations. Accurately parsing such complex structures while maintaining the efficiency gains of distributed processing requires careful consideration.

Furthermore, the integration of CSV processing systems with modern data processing pipelines introduces additional complexities. These pipelines often require support for both batch processing and continuous data ingestion scenarios, necessitating flexible and adaptable processing approaches.

Aspects of the present disclosure include a data platform, systems, methods, and devices that address the foregoing issues, among others, with a file ingestion system that performs parallel processing of files during ingestion across multiple machines in distributed computing environments. In an example, the system analyzes input files (e.g., CSV files) and creates logical divisions defining virtual chunks for parallel processing. The file ingestion system assigns these chunks to available worker machines (also referred to herein as "worker nodes" or simply as "workers") using a distribution method based on chunk and file size. The techniques for virtual file splitting and distribution of chunks among work machines utilized by the file ingestion system allow for efficient distribution of large input files across multiple worker machines, significantly improving CPU utilization and reducing execution time-skew relative to traditional ingestion methods. As used herein, a "chunk" refers to a portion of a file.

The file ingestion system employs a flexible chunk boundary determination approach to handle various formatting scenarios, using different analysis approaches depending on the complexity of the file structure. This flexible chunk boundary determination approach allows the file ingestion system to handle various file formatting scenarios, including complex structures with multi-line fields and different escape character configurations, ensuring accurate parsing while maintaining parallel processing efficiency. In an example, in instances in which the input file is a CSV file that allows quoted fields, the file ingestion system employs a two-pass approach where the worker machines perform analysis passes (first pass) to collect summary statistics, while a coordinator calculates adjusted chunk boundaries based on these statistics. The workers then perform data scan passes (second pass) on the adjusted chunks, parsing and extracting data. The coordinator aggregates chunk-level statistics into file-level statistics, and creates load history entries based on the aggregated statistics.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines that provide on-demand data storage to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

In an example, the metadata data store 113 can include metadata that includes information about data stored in a table such as minimum and maximum values stored in particular portions of the table. For example, the metadata associated with the table may specify a minimum and maximum value for each storage unit and/or each block of the table. The metadata stored in the metadata data store 113 can be used by one or more components of the data platform 102 to perform pruning during query processing. That is, given a query directed at a table organized into storage units (e.g., a set of micro-partitions), one or more components of the data platform 102 can use the metadata to identify a reduced set of storage units to scan in executing the query.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is further coupled to the execution platform 110, which includes multiple virtual warehouses (computing clusters) that execute various data storage and data retrieval tasks. A set of processes on a compute node executes at least a portion of a query plan compiled by the compute service manager 108.

As shown, the execution platform 110 includes virtual warehouse A, virtual warehouse B, and virtual warehouse C. Each virtual warehouse includes multiple execution nodes; each of which includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution nodes, or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 stores database data such as standard tables 105 and hybrid tables 107. In an example, database data is organized as records (e.g., rows or a collection of rows) that each include one or more attributes (e.g., columns). Database data may be physically stored within the data storage 104 in multiple storage units, which may be referred to as partitions, micro-partitions, and/or by one or more other names. In an example, multiple storage units of a database can be stored in a block and multiple blocks can be grouped into a single file. That is, a database can be organized into a set of files where each file includes a set of blocks where each block includes a set of more granular storage units such as partitions. It should be understood that the terms "row" and "column" are used for illustration purposes and these terms are interchangeable. Data arranged in a column of a table can similarly be arranged in a row of the table.

Standard tables 105 are primarily designed for analytical workloads and store data in a columnar format organized into multiple storage units (e.g., partitions or micro-partitions), which allows for efficient compression and optimized performance for large analytical queries.

Hybrid tables 107 are optimized for hybrid transactional and operational workloads that require low latency and high throughput on small random point reads and writes. Hybrid tables 107 leverage the strengths of both OLTP and OLAP capabilities, allowing for efficient point lookups and small range scans typical in transactional processing, as well as large-scale analytical queries that may span significant portions of the dataset. Hybrid tables 107 use a row-oriented primary data layout with a secondary columnar storage, enabling better performance for operational queries while still supporting analytical workloads. Hybrid tables 107 implement row-level locking, which allows for more granular concurrency control compared to standard tables 105 that utilize partition or table-level locking mechanisms. One of the key features of hybrid tables 107 is their support for enforced unique and referential integrity constraints. Unlike standard tables 105, hybrid tables 107 enforce primary key constraints. This makes hybrid tables 107 suitable for maintaining data integrity in transactional workloads. Additionally, hybrid tables 107 support indexes that are synchronously updated on writes, improving performance for point-lookup operations.

Hybrid tables 107 are designed to work with other features of the data platform 102, allowing users to run hybrid workloads that mix operational and analytical queries. Hybrid tables 107 can be joined with standard tables 105, and queries are executed natively and efficiently in the same query engine without the need for federation. This integration enables atomic transactions across hybrid tables 107 and standard tables 105 without requiring manual orchestration of two-phase commits.

The data storage 104 comprises multiple data storage devices. In some embodiments, the data storage devices are cloud-based storage devices located in one or more geographic locations. For example, the data storage devices may be part of a public cloud infrastructure or a private cloud infrastructure. The data storage devices may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems [HDFS]), object storage systems, and the like. In some examples, the storage devices are managed and provided by a third-party data storage platform (e.g., AWS®, Microsoft Azure Blob Storage®, or Google Cloud Storage®).

Each virtual warehouse can access any of the data storage devices. Thus, the virtual warehouses are not necessarily assigned to a specific data storage device and, instead, can access data from any of the data storage devices within the data storage 104. Similarly, each of the execution nodes shown in FIG. 1 can access data from any of the data storage devices in the data storage 104. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage 104 is decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

As shown, the data platform 102 comprises a file ingestion system 130 for ingesting files into the data platform 102. During ingestion, the file ingestion system 130 performs parallel processing of input files across multiple server machines to load data from the files into data structures (e.g., standard tables 105 and hybrid tables 107) used by the data platform 102 for storing (e.g., in data storage 104) and analyzing data. The file ingestion system 130 analyzes input files and creates logical divisions for parallel processing and assigns these chunks to available worker machines using a distribution method based on file size and chunk size (e.g., a round-robin distribution method or a greedy distribution method). The file ingestion system 130 employs a flexible boundary determination approach to handle various formatting scenarios, using different analysis approaches depending on the complexity of the file structure. Worker machines perform analysis passes to collect summary statistics, while a coordinator calculates adjusted chunk boundaries based on these statistics. The workers then perform data scan passes on the adjusted chunks, parsing and extracting data to populate data structures for storing the data from the input files. The coordinator aggregates chunk-level statistics into file-level statistics, and a load history generator creates load history entries based on the aggregated statistics.

In some examples, at least a portion of the file ingestion system 130 is implemented by the execution platform 110. For example, one or more execution nodes of the execution platform 110 can be configured to be or include one or more workers and/or a coordinator of the file ingestion system 130.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service managers 108, metadata data stores 113, execution platforms 110, and data storages 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices in the data storage 104. Thus, the computing resources and cache resources are not restricted to specific data storage devices. Instead, all computing resources and all cache resources may retrieve data from, and store data to, any of the data storage resources in the data storage 104.

Figure 2:
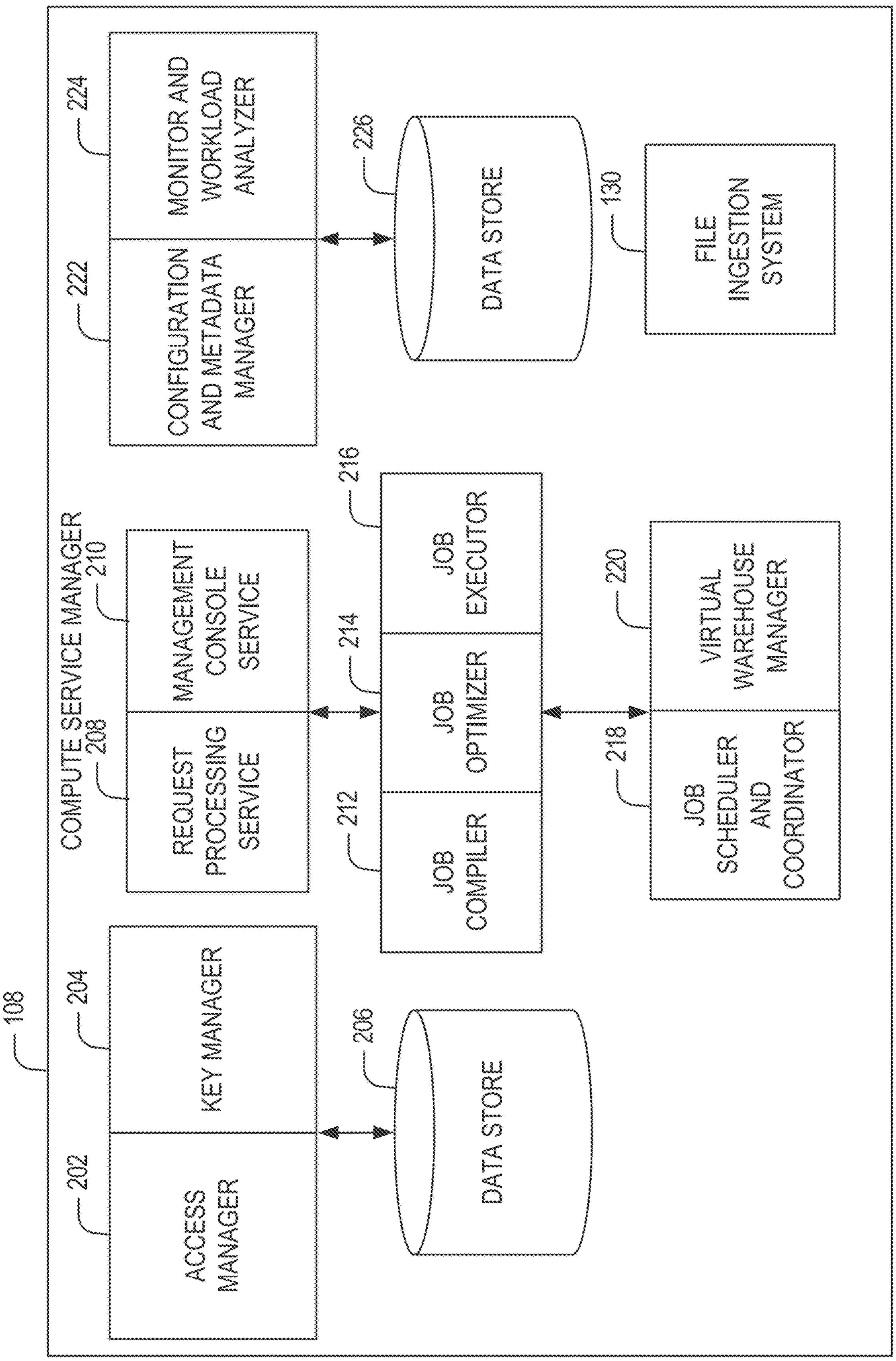
FIG. 2 is a block diagram illustrating components of a compute service manager of the cloud data platform, in accordance with some examples.

FIG. 2 is a block diagram illustrating components of the compute service manager 108 of FIG. 1, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104 of FIG. 1).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110 of FIG. 1. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110, any one of which may be configured (e.g., by the virtual warehouse manager 220) to include any one or more of a table scan node and a top K node. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks as needed, based on changing workloads throughout the cloud data platform 102, and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

As shown in FIG. 2, the compute service manager 108 includes at least a portion of the file ingestion system 130, further details of which are provided below.

Figure 3:
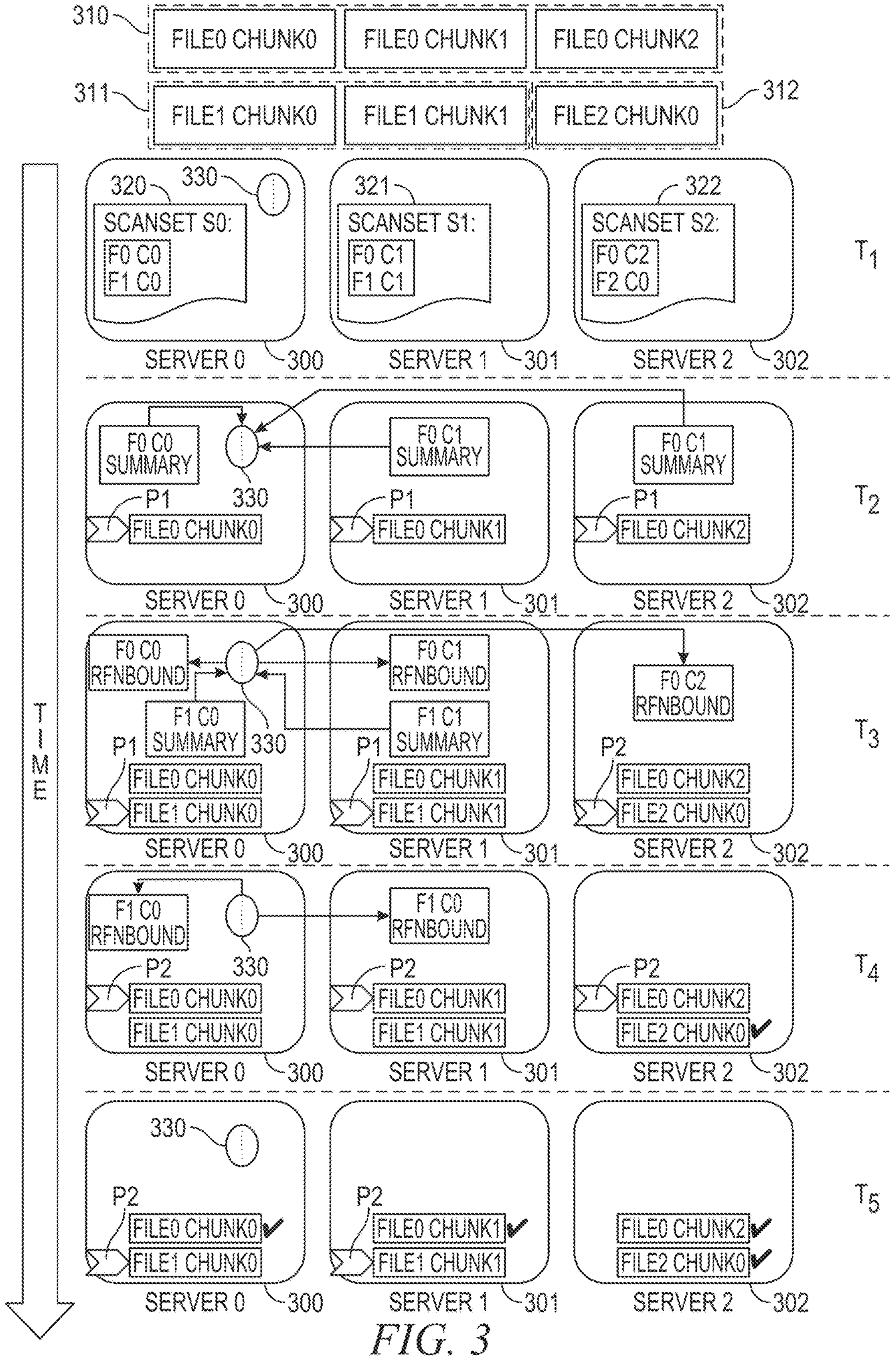
FIG. 3 is a flow diagram illustrating example interactions between multiple server machines in processing multiple input files in parallel, in accordance with some examples.

FIG. 3 is a flow diagram illustrating example interactions between multiple server machines of the file ingestion system 130 in processing multiple input files, in accordance with some examples. More specifically, FIG. 3 illustrates interactions between server machines 300 (Server0), 301 (Server1), and 302 (Server2) of the file ingestion system 130 in processing input files 310 (File0), 311 (File1), and 312 (File2) in parallel. Consistent with some examples, the server machines 300-302 correspond to execution nodes in the execution platform 110.

The parallel processing occurs in multiple stages, represented by the vertical time progression from $t_1$ to $t_5$ in FIG. 3. Throughout the process, the server machines 300-302 are configured by the file ingestion system 130 to operate as workers (also referred to as "worker nodes") to process the input files while server machine 300 is also configured as a coordinator 330, the function of which is discussed in further detail below.

As shown, the file ingestion system 130 initially divides the input files into multiple virtual chunks with file 310 (File0) split into three chunks (File0 Chunk0, File0 Chunk1, and File0 Chunk2), file 311 (file1) into two chunks (File 1Chunk0 and File 1 Chunk1), and file 312 (File2) consisting of a single chunk (File 2 Chunk0).

In some examples, the virtual splitting of an input file into chunks is based on a target chunk size determined based on the file size of the input file and the number of workers assigned to process the input file. Consistent with these examples, the input file is split into chunks of the target chunk size and may include at least one remaining chunk that is smaller than the target chunk size.

In some examples, the virtual file splitting includes calculating a target chunk size based on a file size of each of the input files 310-312 and the number of worker nodes assigned to processing the input files 310-312. Each file is divided into chunks based on the target chunk size. For instance, if the target chunk size is determined to be 100 megabytes, a one-gigabyte file would be split into 10 chunks.

The file ingestion system 130 assigns each worker (each server) a scanset, which is a collection of file chunks to be processed. In an example, the assignment process of the file ingestion system 130 follows a round-robin distribution method, where chunks are assigned to workers in a circular order. Specifically, scanset 320 (S0) is assigned to server machine 300 (Server0) and includes File0 Chunk0 and File1 Chunk0. Scanset 321 (S1) is assigned to server machine 301 (Server1) and includes File0 Chunk1 and File1 Chunk1. Scanset 322 (S2) is assigned to server machine 302 (Server 2) and includes File0 Chunk2 and File2 Chunk0. This distribution method aims to balance the workload across the servers, ensuring that each server receives approximately equal amounts of data to process.

At an initial stage, each worker begins processing its assigned chunks, as shown at to. As processing progresses, the workers perform an analysis pass (denoted by "P1" in FIG. 3; also referred to herein as a "boundary scan pass" or simply as a "boundary scan") on the chunks to which they are assigned to generate summary statistics for each chunk. For example, as shown at $t_1$, server machine 300 generates summary statistics for File0 Chunk0 ("F0 C0 Summary"), server machine 301 generates summary statistics for File0 Chunk1 ("F0 C1 Summary") and server machine 302 generates summary statistics for File0 Chunk2 ("F0 C2 Summary") As another example, as shown at $t_2$, server machine 300 generates summary statistics for File1 Chunk0 ("F1 C0 Summary"), server machine 301 generates summary statistics for File1 Chunk 1 ("F1 C1 Summary"), and server machine 302 generates summary statistics for File 0 Chunk 2 ("F0 C2 Summary"). The summary statistics generated for a given chunk include: a number of quotes in the chunk; a position of the first record delimiter after an even number of quotes; and a position of the first record delimiter after an odd number of quotes.

The summary statistics for each chunk are provided to the coordinator 330. Based on the summary statistics, the coordinator 330 performs boundary calculations to determine adjusted chunk boundaries (also referred to herein as "refined chunk boundaries" or simply as "refined boundaries") comprising the actual boundaries (a start position and an end position) for each chunk. The coordinator 330 sequentially iterates over the summary statistics of all chunks to compute the start positions of adjusted chunks, determines whether each chunk starts in the middle of a quoted field based on the sum of quotes in previous chunks, and selects the appropriate group of summary statistics for each chunk based on its start position. The coordinator 330 calculates the end position of each adjusted chunk using the start position of the next adjusted chunk. As an example, as shown at $t_2$, the coordinator 330 determines the actual boundaries for: File0 Chunk 0 ("F0 C0 FinBound") based on the summary statistics for File0 Chunk 0 ("F0 C0 Summary"); File0 Chunk 1 ("F0 C1 FinBound") based on the summary statistics for File0 Chunk 1 ("F0 C1 Summary"); and File0 Chunk 2 ("F0 C2 FinBound") based on the summary statistics for File1 Chunk 2 ("F1 C2 Summary"). As another example, as shown at $t_3$, the coordinator 330 determines the actual boundaries for: File1 Chunk 0 ("F1 C0 FinBound") based on the summary statistics for File1 Chunk 0 ("F1 C0 Summary"); and File1 Chunk 1 ("F1 C1 FinBound") based on the summary statistics for File1 Chunk 2 ("F1 C1 Summary").

The coordinator 330 sends the final adjusted chunk boundaries back to the workers (server machines 300-302) for a data scan pass (denoted in FIG. 3 as "P2") in the final stage of processing where data structures (e.g., column sets or row sets of a database) are populated with information extracted from the input files. For example, as shown at $t_3$, server machine 300 performs a data scan pass of File 0 Chunk0 based on the actual boundaries for File 0 Chunk0 ("F0 C0 FinBound") determined by the coordinator 330, server machine 301 performs a data scan pass of File 0 Chunk1 based on the actual boundaries for File 0 Chunk1 ("F0 C1 FinBound") determined by the coordinator 330, server machine 302 performs a data scan pass of File 0 Chunk2 based on the actual boundaries for File 0 Chunk2 ("F0 C2 FinBound") determined by the coordinator 330. Each of the data scans performed at $t_3$ are completed at $t_4$, as denoted by the check mark. As another example, as shown at $t_4$, server machine 300 performs a data scan pass of File 1 Chunk0 based on the actual boundaries for File 1 Chunk0 ("F1 C0 FinBound") determined by the coordinator 330, and server machine 301 performs a data scan pass of File 1 Chunk1 based on the actual boundaries for File 0 Chunk1 ("F0 C1 FinBound") determined by the coordinator 330.

In the example illustrated by FIG. 3, the file ingestion system 130 implements an interleaved approach for the boundary scan and data scan passes of the two-pass approach. The interleaved approach utilizes a single RSO that allows for concurrent execution of boundary scans and data scans. In the interleaved approach, workers perform boundary scans and data scans in parallel, with the coordinator 330 managing the distribution of work. The coordinator 330 receives summary statistics from workers performing boundary scans and calculates adjusted chunk boundaries. These adjusted chunks are then sent back to workers for data scanning. The interleaved approach includes mechanisms for prioritizing between boundary scans and data scans, as well as managing the scheduling of worker threads. This method aims to optimize CPU utilization and reduce overall execution time by allowing data scanning to begin before all boundary calculations are completed.

In some examples, the file ingestion system 130 implements a serial approach to support the boundary scan and data scan passes of the two-pass approach rather than the interleaved approach discussed above. The serial approach involves utilizing multiple row set operators (RSO) to perform actions in series. Specifically, a boundary scan operator assigns chunks to each worker to analyze and collect statistics on quotes and record delimiters. A partition order by operator then orders the chunks for each file. Finally, a boundary calculation operator uses the collected statistics to calculate refined chunk boundaries for each file. After the boundary scan pass is complete, a data scan operator performs the data scan pass using the refined chunk boundaries. This serial approach ensures that all boundary calculations are completed before any data scanning begins.

In the example illustrated by FIG. 3, the file ingestion system utilizes a two-pass approach for processing the files. However, the file ingestion system 130 may employ different techniques for performing the boundary calculations depending on whether the input file allows quoted fields. For example, when an input file allows quoted fields, the system may employ the two-pass approach (analysis pass and data scan pass) for chunk boundary determination, as illustrated by FIG. 3. In examples where an input file does not allow quoted fields, boundary determination may follow a zero-pass approach where no additional analysis is needed to adjust chunk boundaries. In this scenario, each server processes its assigned chunk by skipping to the bytes right after the first record delimiter within the chunk and stopping when it finds the first record delimiter that is entirely in the next chunk.

In some examples, the file ingestion system 130 utilizes a speculative approach to chunk boundary determination rather than the zero-pass or two-pass approach described above. The speculative approach to boundary determination involves a framework where workers attempt to predict the correct boundaries for chunks without performing a full analysis pass. This approach uses an ambiguity checker to determine if a chunk can be unambiguously parsed. If ambiguity is detected, a speculator component predicts whether the chunk starts in a quoted or unquoted state based on statistical models. The workers then process the chunks according to these predictions, and a validator component on the coordinator side verifies the correctness of the speculations by checking if the predicted adjusted chunks are connected end-to-end. If a misprediction occurs, the system falls back to a non-parallel scan approach for that particular file.

Figure 4:
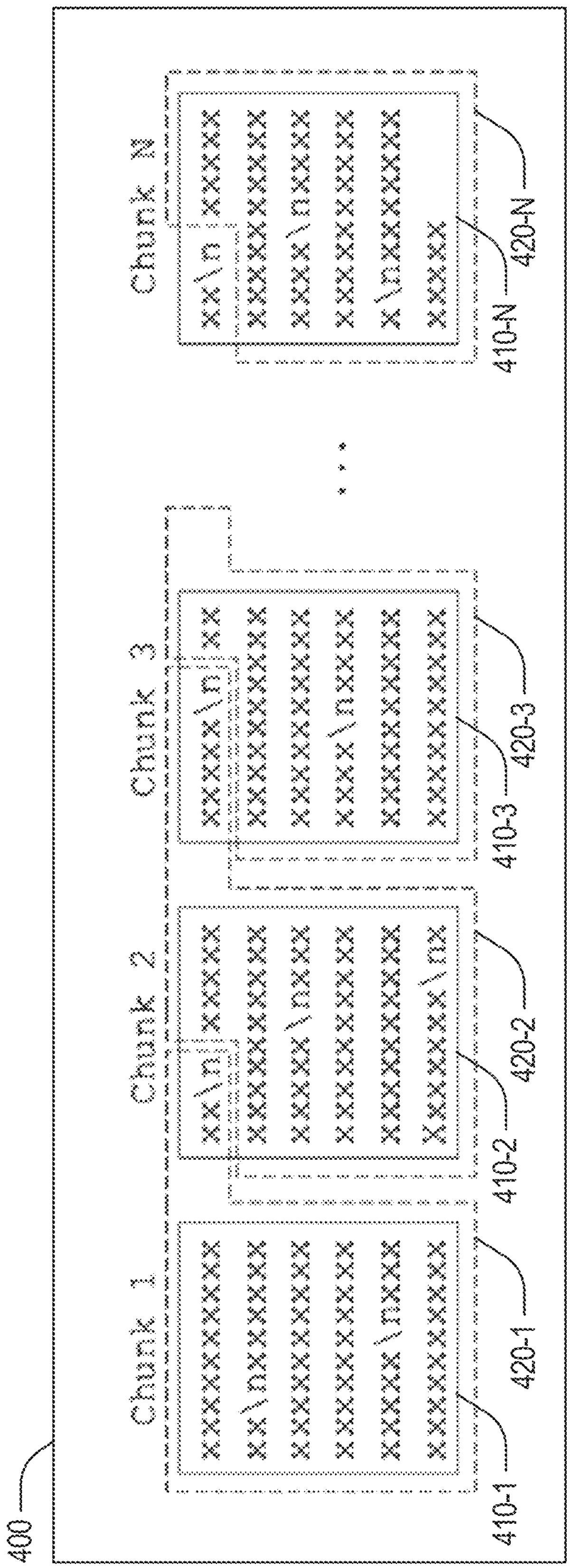
FIG. 4 is a conceptual diagram illustrating an example of splitting an input file into multiple chunks, in accordance with some examples.

FIG. 4 is a conceptual diagram illustrating an example of splitting an input file 400 into multiple chunks, in accordance with some examples. Specifically, the input file 400 is split into chunks 1-N. Within each chunk, data is shown as a series of "X" characters, representing the file content, interspersed with newline characters ("\n") that serve as record delimiters.

Initially, the file ingestion system 130 adds logical divisions 410-1 to 410-N into the input file 400 to virtually split the input file 400 into the chunks 1-N. These logical divisions 410-1 to 410-N form the initial boundaries of the chunks 1-N. In some examples, the virtual splitting is based on the file size of the input file 400 and the number of workers (e.g., server machines) assigned to processing the input file 400 and does not account for the structure of the data within the file. For input files like CSV, where records can span multiple lines and may contain quoted fields with embedded delimiters, simply processing chunks based on their initial boundaries can lead to incomplete or incorrect data processing. Hence, the chunk boundaries are adjusted to ensure that each chunk begins and ends with complete records, even when the original chunk division occurs in the middle of a record.

Refined chunk boundaries 420-1 to 420-N corresponding to the actual boundaries for the chunks 1-N are calculated by a coordinator (e.g., coordinator 330) based on the location of record delimiters. The boundary calculation process involves finding the appropriate record delimiters within and around each chunk. For each chunk, the adjusted start position is set to the first record delimiter found within the chunk, while the adjusted end position is set to the first record delimiter found in the subsequent chunk. This approach ensures that each chunk contains only whole records, facilitating accurate parallel processing of the input file.

Figure 5:
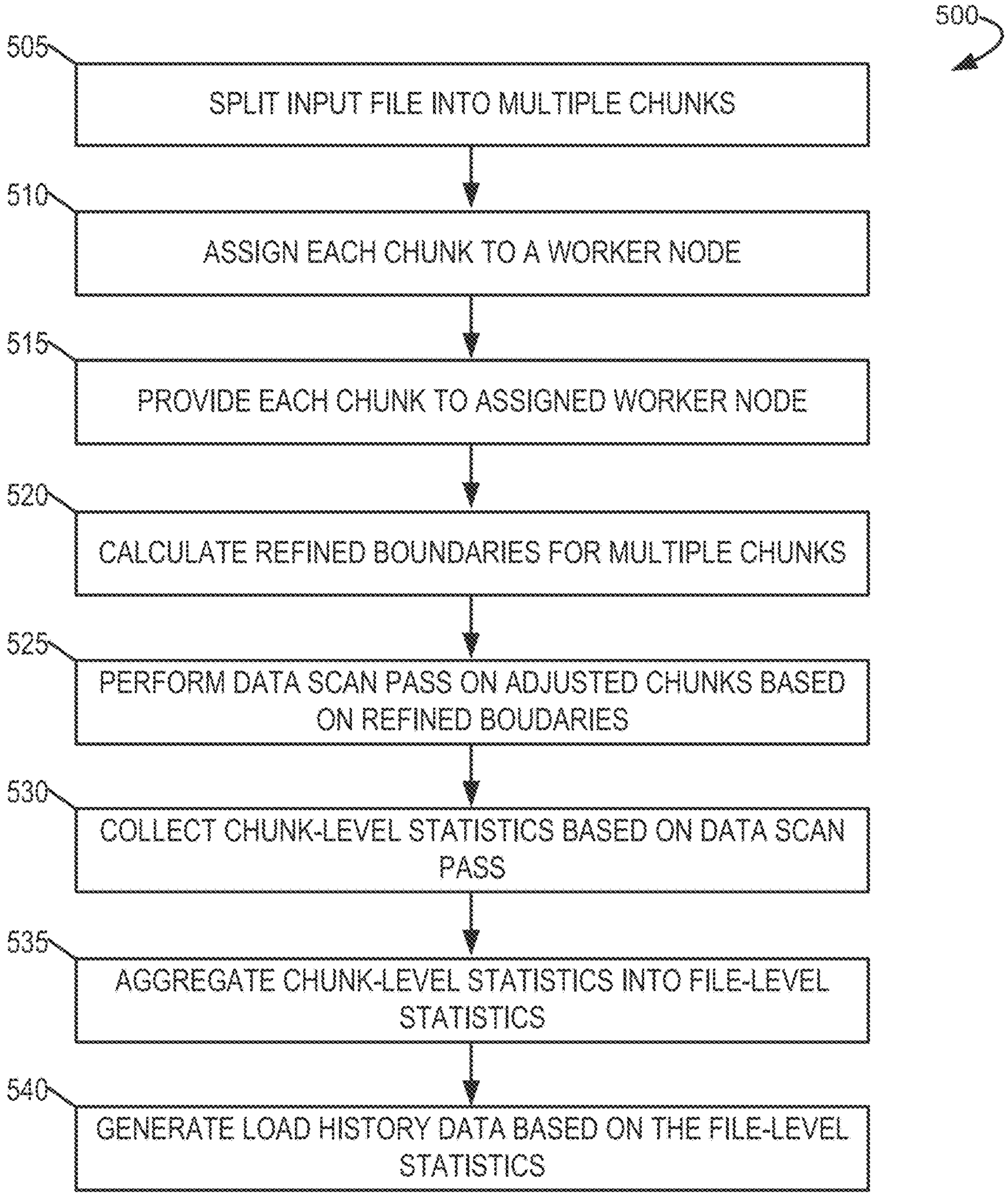
FIGS. 5-7 are flow diagrams illustrating operations of the cloud data platform in performing a method for parallel processing of an input file, in accordance with some examples.
Figure 6:
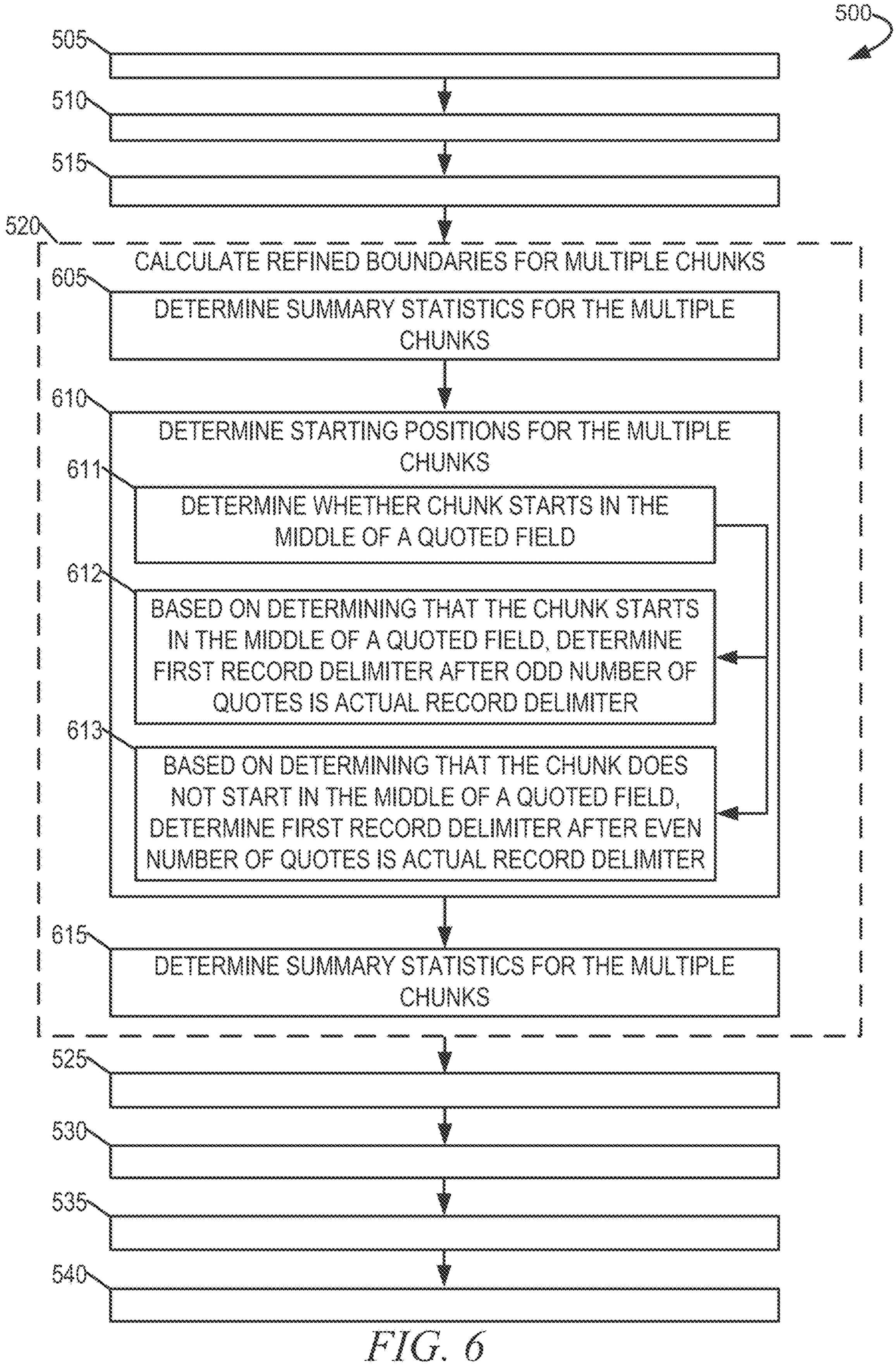
Figure 7:
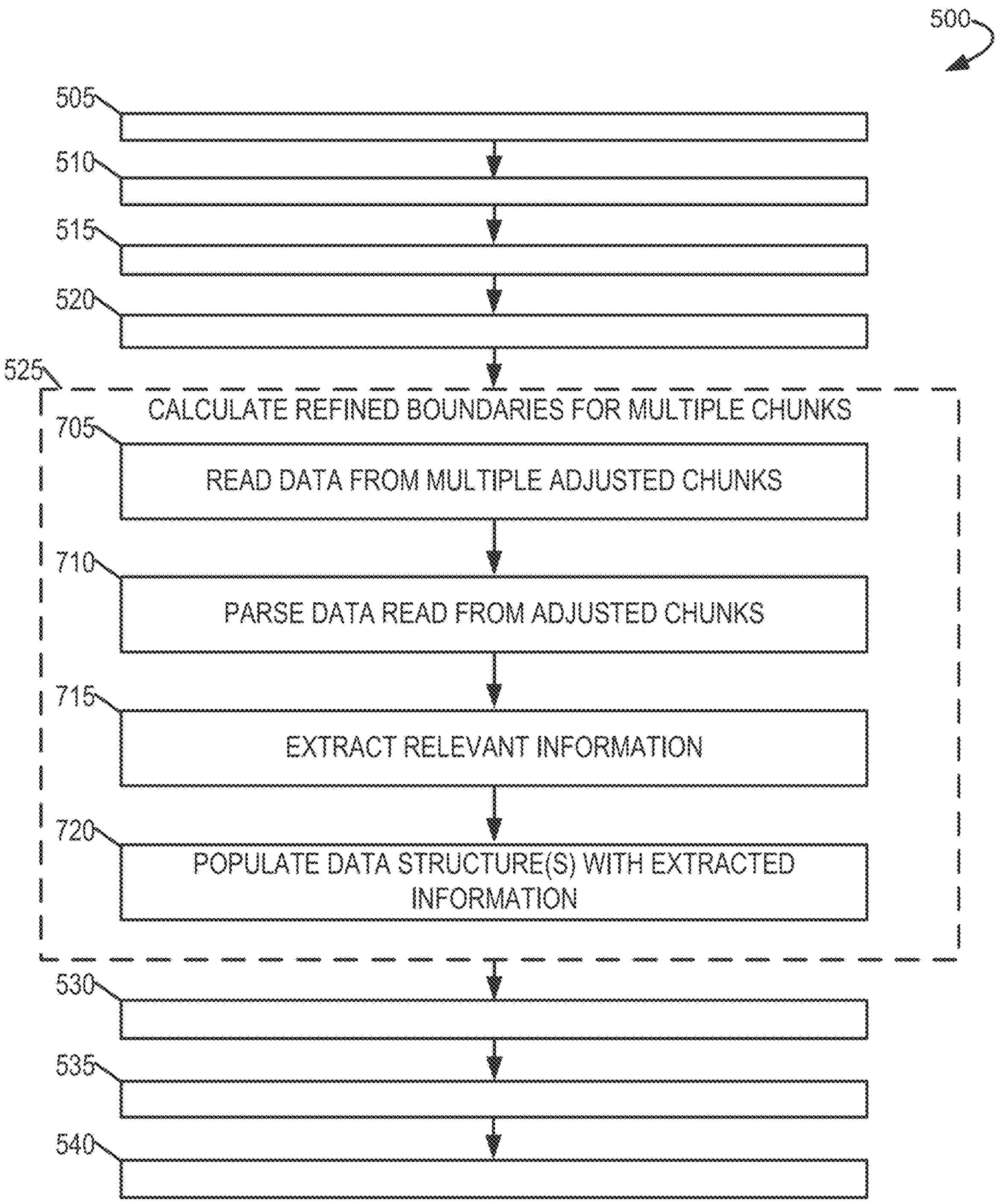

FIGS. 5-7 are flow diagrams illustrating operations of the cloud data platform in performing a method 500 for parallel processing of an input file, in accordance with some examples. The method 500 may be embodied in computer-readable instructions for execution by one or more hardware components (e.g., one or more processors) such that the operations of the method 500 may be performed by components of the file ingestion system 130. Accordingly, the method 500 is described below, by way of example with reference thereto. However, it shall be appreciated that the method 500 may be deployed on various other hardware configurations and is not intended to be limited to deployment within file ingestion system 130.

Depending on the embodiment, an operation of the method 500 may be repeated in different ways or involve intervening operations not shown. Though the operations of the method 500 may be depicted and described in a certain order, the order in which the operations are performed may vary among embodiments, including performing certain operations in parallel or performing sets of operations in separate processes or separate threads.

In the context of method 500, an input file is received for ingestion into the data platform 102. The input file may be or comprise a CSV file. Multiple worker nodes (e.g., one or more of the execution nodes of the execution platform 110) are assigned to process the input file.

At operation 505, the file ingestion system 130 splits the input file into multiple chunks. To split the input file into multiple chunks, the file ingestion system 130 creates multiple logical divisions in the input file to create multiple virtual chunks without physically changing or altering the input file. In some examples, the splitting of the input file includes determining a chunk size for the multiple chunks based on a file size of the input file and a number of worker nodes assigned to processing the input file. For example, the chunk size may be determined by dividing the file size of the input file by the number of worker nodes assigned to processing the input file. Consistent with this example, the data platform 102 splits the input file into multiple chunks of the file size until the remainder of the file size becomes smaller than a predefined multiplier of the chunk size. That is, the multiple chunks include multiple chunks of the chunk size and at least one chunk that is smaller than the chunk size.

In some examples, the input file is one of multiple input files in a scanset being processed in parallel and the virtual splitting of the input files is based on a target chunk size determined based on an overall size of the scanset rather than the size of individual files. Consistent with these examples, the target chunk size is determined by dividing the overall size of the scanset by a predetermined value. The predetermined value may, for example, be based on a desired chunk size, available computational resources, or specific system requirements.

The file ingestion system 130 assigns each chunk of the input file to one of the worker nodes assigned to processing the input file, at operation 510, and the data platform 102 provides each chunk to the assigned worker node, at operation 515. In an example, the file ingestion system 130 assigns the chunks to the worker nodes using a round-robin distribution technique. In some examples, the file ingestion system 130 assigns a scanset to each worker node and the scanset includes at least one chunk from the input file and may include one or more chunks from other input files.

At operation 520, the file ingestion system 130 calculates refined boundaries (actual boundaries) for the multiple chunks. The refined boundaries define multiple adjusted chunks. As noted above, different approaches may be utilized in calculating the defined boundaries, which may depend on whether the input file allows quote fields. An example that is consistent with the two-pass approach is illustrated by FIG. 6.

As shown in FIG. 6, the method 500 may include operations 605, 610, and 615 in examples in which the input file allows quoted fields. Consistent with these examples, the operations 605, 610, and 615 are performed as part of operation 520 where the refined boundaries for the multiple chunks are calculated.

At operation 605, the multiple worker nodes of the file ingestion system 130 determine summary statistics for the multiple chunks. More specifically, each worker node performs an analysis pass on one or more chunks to which it is assigned to determine summary statistics for the one or more chunks. For a given chunk, the summary statistics include a number of quotes in the chunk, a position of a first record delimiter after an even number of quotes, and a position of a first record delimiter after an odd number of quotes.

The worker nodes provide the summary statistics to a coordinator in the file ingestion system 130 (e.g., the coordinator 330) that determines start positions for the multiple chunks based on the summary statistics at operation 610. In determining the start position of a given chunk (e.g., a Kth chunk) in the file, the coordinator determines whether the chunk starts in the middle of a quoted field (operation 611) based on whether the sum of quotes in preceding chunks (e.g., chunks 0 to K-1) is odd or even. If the sum of quotes in the preceding chunks is odd, the coordinate determines the chunk starts in the middle of a quoted field. Conversely, if the sum of quotes in the preceding chunks is even, the coordinator determines that the chunk does not start in the middle of a quoted field. Based on determining that the chunk starts in the middle of a quoted field, the coordinator determines the first record delimiter after the odd number of quotes is the actual record delimiter for the chunk and thus the position of this delimiter is the start position for the chunk (operation 612). Based on determining that the chunk does not start in the middle of a quoted field, the coordinator determines the first record delimiter after the even number of quotes is the actual record delimiter for the chunk and thus the position of this delimiter is the start position for the chunk (operation 613).

At operation 615, the coordinator determines end positions of the multiple chunks based on the determined start positions of the multiple chunks. For example, the end position of a given chunk is obtained from the determined start position of the proceeding chunk.

With returned reference to FIG. 5, at operation 525, the worker nodes perform a data scan pass on the adjusted chunks based on the refined boundaries. As shown in FIG. 7, the method 500 can, in some examples, include operations 705, 710, 715, and 720, which are performed as part of the operation 525, consistent with these examples. At operation 705, the worker nodes read data from the multiple adjusted chunks based on the refined boundaries. As an example, a worker node assigned to a given chunk reads data between the start position and end position determined for the chunk at operation 520.

At operation 710, the worker nodes parse the data read from the adjusted chunks and extract relevant information based on the parsing, at operation 615. Following the example of the worker node above, the worker node parses the data read from the adjusted chunk and extracts relevant information from the data.

At operation 720, the worker nodes populate one or more data structures for storing information extracted from the ingested input file using the information extracted from the adjusted chunks. Following the example from above, the worker node populates one or more column sets (or one or more row sets) of a database with the information extracted from the data read from the adjusted chunk.

With returned reference to FIG. 5, at operation 530, the worker nodes collect chunk-level statistics based on the data scan pass. The chunk-level statistics comprise summary data about the adjusted chunks.

At operation 535, the coordinator aggregates the chunk-level statistics into file-level statistics. The coordinator aggregates chunk-level statistics into file-level statistics using an in-memory singleton map associated with the processing of the input file. For each file, the map stores information such as rows inserted, rows parsed, error counts, and error messages. After all chunks from the input file are processed, the entries in the singleton map represent the aggregated statistics for the entire file.

At operation 540, the coordinator generates load history data based on the file-level statistics. After the chunk-level statistics are combined into file-level statistics, the coordinator converts the in-memory singleton map containing the aggregated data into load history entries. These entries are then used to create load history files or data processing object entries for the metadata data store 113. The load history data includes information such as the number of rows inserted, rows parsed, error counts, and error messages for each file processed. By generating this load history data, the coordinator enables the system to maintain comprehensive records of file processing operations, which can be accessed and utilized by multiple ingestion mechanisms supported by the data platform 102 for reporting and analysis purposes.

Figure 8:
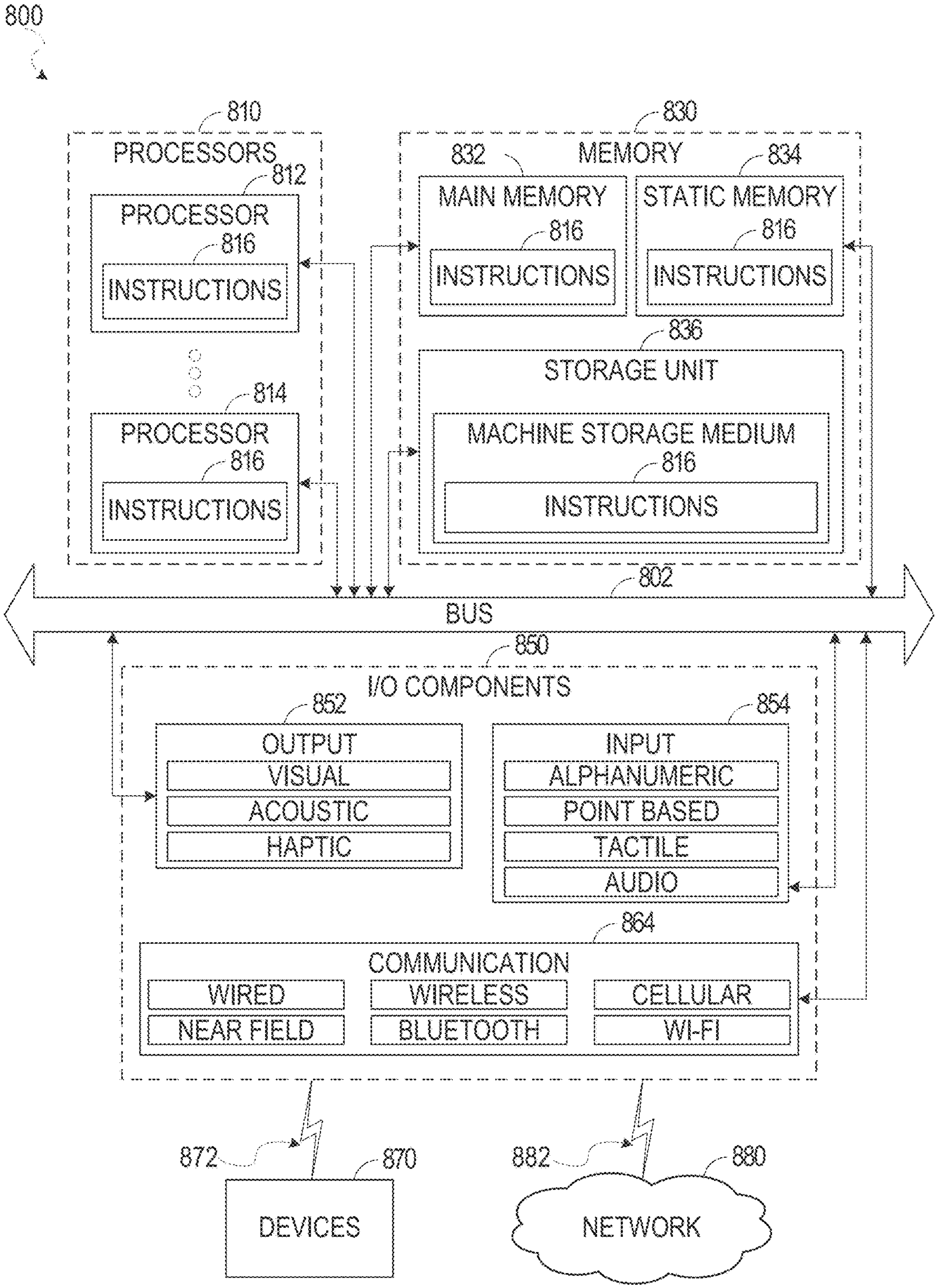
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., a software, a program, an application, an applet, an app, or other executable code) for causing the machine 800 to perform any one or more of the methodologies discussed herein may be executed. For example, the instructions 816 may cause the machine 800 to execute any one or more operations of the method 500. As another example, the instructions 816 may cause the machine 800 to implement portions of the functionality illustrated in any one of FIGS. 1-4. In this way, the instructions 816 transform a general, non-programmed machine into a particular machine that is specially configured to carry out any one of the described and illustrated functions of the data platform 102 such as the compute service manager 108 (or a component thereof) or an execution node of the execution platform 110.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 814 and a processor 812 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel [PDP], a light emitting diode [LED] display, a liquid crystal display [LCD], a projector, or a cathode ray tube [CRT]), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus [USB]). For example, as noted above, the machine 800 may correspond to any one of the compute service manager 108, the execution platform 110, and the devices 870 may include the data store 206 or any other computing device described herein as being in communication with the data platform 102 or the data storage 104.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol [HTTP]). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:

determining a chunk size for an input file based on a file size of the input file and a number of worker nodes assigned to processing the input file;

splitting the input file into multiple chunks based on the chunk size, at least one chunk in the multiple chunks being smaller than the chunk size;

assigning each chunk of the multiple chunks to one of multiple worker nodes assigned to processing the input file;

calculating refined boundaries for the multiple chunks, the refined boundaries defining multiple adjusted chunks, the calculating of the refined boundaries comprising:

determining, by the multiple worker nodes, summary statistics for the multiple chunks;

determining, by a coordinator, start positions of the multiple chunks based on the summary statistics; and determining, by the coordinator, end positions of the multiple chunks based on the start positions of the multiple chunks; and performing data scan passes on the multiple adjusted chunks based on the refined boundaries to populate one or more data structures for storing information extracted from the input file.

2. The method of claim 1, comprising:

collecting chunk-level statistics based on the data scan passes on the multiple adjusted chunks, the chunk-level statistics comprising summary data describing the multiple adjusted chunks;

aggregating chunk-level statistics into file-level statistics; and generating load history data based on the file-level statistics.

3. The method of claim 2, wherein the aggregating of the chunk-level statistics into file-level statistics comprises using a singleton map to aggregate the chunk-level statistics into the file-level statistics.

4. The method of claim 1, wherein the splitting of the input file into the multiple chunks comprises creating multiple logical divisions in the input file.

5. The method of claim 1, wherein the assigning of each chunk of the multiple chunks to one of the multiple worker nodes comprises using a round robin distribution technique.

6. The method of claim 1, wherein the performing of the data scan passes comprises:

reading data from each of the multiple adjusted chunks based on the refined boundaries;

parsing the data;

extracting information based on parsing the data; and populating the one or more data structures with the extracted information.

7. The method of claim 6, wherein populating the one or more data structures comprises populating one or more column sets with the extracted information.

8. The method of claim 1, wherein the performing of the data scan passes comprises performing a data scan pass on an adjusted chunk by a worker node assigned to the adjusted chunk, the performing of the data scan pass on the adjusted chunk comprises:

reading, by the worker node, data from the adjusted chunk based on calculated boundaries for the adjust chunk;

parsing, by the worker node, the data read from the adjusted chunk;

extracting, by the worker node, information based on parsing the data; and populating, by the worker node, a column set with the extracted information.

9. The method of claim 1, wherein the summary statistic for a chunk in the multiple chunks comprises:

a number of quotes in the chunk, a position of a first record delimiter after an even number of quotes, and a position of a first record delimiter after an odd number of quotes.

10. The method of claim 9, wherein the calculating of the refined boundaries for the multiple chunks comprises:

determining the chunk starts in the middle of a quoted field based on a sum of quotes in preceding chunks being odd; and based on determining the chunk starts in the middle of a quoted field, determining the first record delimiter after the odd number of quotes is an actual record delimiter for the chunk.

11. The method of claim 9, wherein the calculating of the refined boundaries for the multiple chunks comprises:

determining the chunk does not start in the middle of a quoted field based on a sum of quotes in preceding chunks being even; and based on determining the chunk does not start in the middle of a quoted field, determining the first record delimiter after the even number of quotes is an actual record delimiter for the chunk.

12. The method of claim 1, wherein the input file comprises a comma separated values (CSV) file.

13. A system comprising:

at least one hardware processor;

at least one memory storing instructions that cause the at least one hardware processor to perform operations comprising:

determining a chunk size for an input file based on a file size of the input file and a number of worker nodes assigned to processing the input file;

splitting the input file into multiple chunks based on the chunk size, at least one chunk in the multiple chunks being smaller than the chunk size;

assigning each chunk of the multiple chunks to one of multiple worker nodes assigned to processing the input file;

calculating refined boundaries for the multiple chunks, the refined boundaries defining multiple adjusted chunks, the calculating of the refined boundaries comprising:

determining, by the multiple worker nodes, summary statistics for the multiple chunks;

determining, by a coordinator, start positions of the multiple chunks based on the summary statistics; and determining, by the coordinator, end positions of the multiple chunks based on the start positions of the multiple chunks; and performing data scan passes on the multiple adjusted chunks based on the refined boundaries to populate one or more data structures for storing information extracted from the input file.

14. The system of claim 13, wherein the operations comprise:

collecting chunk-level statistics based on the data scan passes on the multiple adjusted chunks, the chunk-level statistics comprising summary data describing the multiple adjusted chunks;

aggregating chunk-level statistics into file-level statistics; and generating load history data based on the file-level statistics.

15. The system of claim 13, wherein the splitting of the input file into the multiple chunks comprises creating multiple logical divisions in the input file.

16. The system of claim 13, wherein the assigning of each chunk of the multiple chunks to one of the multiple worker nodes comprises using a round robin distribution technique.

17. The system of claim 13, wherein the performing of the data scan passes comprises:

reading data from each of the multiple adjusted chunks based on the refined boundaries;

parsing the data;

extracting information based on parsing the data; and populating the one or more data structures with the extracted information.

18. A computer-storage medium comprising instructions that, when executed by one or more processors of a machine, configure the machine to perform operations comprising:

determining a chunk size for an input file based on a file size of the input file and a number of worker nodes assigned to processing the input file;

splitting the input file into multiple chunks based on the chunk size, at least one chunk in the multiple chunks being smaller than the chunk size;

assigning each chunk of the multiple chunks to one of multiple worker nodes assigned to processing the input file;

calculating refined boundaries for the multiple chunks, the refined boundaries defining multiple adjusted chunks, the calculating of the refined boundaries comprising:

determining, by the multiple worker nodes, summary statistics for the multiple chunks;

determining, by a coordinator, start positions of the multiple chunks based on the summary statistics; and determining, by the coordinator, end positions of the multiple chunks based on the start positions of the multiple chunks; and performing data scan passes on the multiple adjusted chunks based on the refined boundaries to populate one or more data structures for storing information extracted from the input file.

19. The computer-storage medium of claim 18, wherein the operations comprise:

collecting chunk-level statistics based on the data scan passes on the multiple adjusted chunks, the chunk-level statistics comprising summary data describing the multiple adjusted chunks;

aggregating chunk-level statistics into file-level statistics; and generating load history data based on the file-level statistics.

20. The computer-storage medium of claim 19, wherein the aggregating of the chunk-level statistics into file-level statistics comprises using a singleton map to aggregate the chunk-level statistics into the file-level statistics.

* * * * *